United States Patent
Attarwala (10) Patent No.: US 7,930,044 B2
(45) Date of Patent: Apr. 19, 2011

(54) USE OF DYNAMIC VARIANCE CORRECTION IN OPTIMIZATION

(75) Inventor: Fakhruddin T Attarwala, Princeton, NJ (US)

(73) Assignee: Fakhruddin T Attarwala, Princeton, NJ (US)

( * ) Notice: Subject to any disclaimer, the term of this patent is extended or adjusted under 35 U.S.C. 154(b) by 229 days.

(21) Appl. No.: 11/799,782

(22) Filed: May 3, 2007

(65) Prior Publication Data

US 2008/0065242 A1  Mar. 13, 2008

(51) Int. Cl.
G05B 13/02 (2006.01)
(52) U.S. Cl. .......................................... 700/44; 700/28
(58) Field of Classification Search .............. 700/28–37, 700/44–46; 702/81–84
See application file for complete search history.

(56) References Cited

U.S. PATENT DOCUMENTS

| | | | | |
|---|---|---|---|---|
| 4,349,869 | A * | 9/1982 | Prett et al. ................... | 700/39 |
| 4,616,308 | A * | 10/1986 | Morshedi et al. ............. | 700/39 |
| 5,602,689 | A * | 2/1997 | Kadlec et al. ................ | 360/78.04 |
| 5,638,230 | A * | 6/1997 | Kadlec ....................... | 360/78.04 |
| 5,677,809 | A * | 10/1997 | Kadlec ....................... | 360/78.09 |
| 5,680,272 | A * | 10/1997 | Kadlec et al. ................ | 360/78.04 |
| 5,684,650 | A * | 11/1997 | Kadlec et al. ................ | 360/77.06 |
| 5,914,830 | A * | 6/1999 | Kadlec et al. ................ | 360/78.14 |
| 6,122,555 | A * | 9/2000 | Lu ............................. | 700/9 |
| 6,347,018 | B1 * | 2/2002 | Kadlec et al. ................ | 360/77.08 |
| 7,058,617 | B1 * | 6/2006 | Hartman et al. .............. | 706/16 |
| 7,187,989 | B2 * | 3/2007 | Attarwala ..................... | 700/29 |
| 7,194,318 | B2 * | 3/2007 | Attarwala ..................... | 700/29 |
| 7,213,006 | B2 * | 5/2007 | Hartman et al. .............. | 706/16 |
| 7,315,846 | B2 * | 1/2008 | Hartman et al. .............. | 706/16 |
| 7,337,022 | B2 * | 2/2008 | Wojsznis et al. ............. | 700/36 |
| 7,433,743 | B2 * | 10/2008 | Pistikopoulos et al. ....... | 700/52 |
| 2004/0049295 | A1 * | 3/2004 | Wojsznis et al. ............. | 700/28 |
| 2006/0224534 | A1 * | 10/2006 | Hartman et al. .............. | 706/15 |
| 2007/0168057 | A1 * | 7/2007 | Blevins et al. ................ | 700/53 |
| 2008/0140227 | A1 * | 6/2008 | Attarwala ..................... | 700/30 |
| 2010/0057222 | A1 * | 3/2010 | Turner et al. ................. | 700/31 |

OTHER PUBLICATIONS

Kantor, Jeffrey et al. Chemical Process Control-V, Assessment & New Directions for Research, 1997, pp. 232-256, Cache, AIChE Symposium Series 316, vol. 93.

Nikolaou, Michael, Model Predictive Controllers: A Critical Synthesis of Theory and Industrial Needs, 2001, Academic Press, Advances in Chemical Engineering Series.

Cutler, C.R., "An Industrial Perspective On Advanced Control." 1983 AIChE, Annual Meeting, Washington DC.

Qin, S. Joe, "A survey of industrial model predictive control technology." 2002, Elsevier Science Ltd., 733-764, Control Engineering Practice 11, Aspen Technology, Inc.

Tyagunov, Andrey A., "High-Performance Model Predictive Control for Process Industry" 2004, Library Technische Universiteit Eindhoven.

Lam, David K., "Optimal steady-state transitions under constrained predictive control" 2006 Elsevier B.V., 1593-1598,16th European Symposium Computer Aided Process Engineering.

Garcia, Carlos E. "Quadratic Programming Solution of Dynamic Matrix Control" 1986 pp. 73-87, Gordon & Breach Science Publishers S.A. vol. 46, Chem Eng. Commun.

* cited by examiner

Primary Examiner — M. N. Von Buhr (57) ABSTRACT

The present invention relates to a steady state optimization method incorporating dynamic variance correction for dynamic variations of both independent variables and dependent variables of a dynamic system. The dynamic variance correction is based on measured variance of the variables and a weighing factor for each of the variables. The dynamic variance correction offers an effective method of dynamic violations avoidance of controlled variables for a model predictive controller without having to constantly adjust the tuning weights in response to changing dynamical conditions.

10 Claims, 9 Drawing Sheets

Fig 1 Present Invention

DeEthanizer Schematic Process Flow Diagram

Fig 4: An Example Process Unit

Example: DeEthanizer

| LogicalName | ProcessVariable | Description | EngUnit |
|---|---|---|---|
| | Manipulated | | |
| MV1 | MXFIC_01SP | Top Reflux Flow Controller Set Point | MBLD |
| MV2 | MXTIC_03SP | Feed Temperature Controller Set Point | degF |
| MV3 | MXFI_05SP | Feed Flow Controller Set Point | MBLD |
| MV4 | MXFI_10SP | Feed Temp Controller Fuel Flow Set Point | MFT3HR |
| MV5 | MXFI_07SP | Top Product Flow SP | MBLD |
| MV6 | MXFI_06SP | Bottom Product Flow SP | MBLD |
| | FeedForward | | |
| FV1 | MX_TI03PV | Feed Inlet Temperature | DegF |
| FV2 | MXAI05_PV | Feed Impurity | % |
| | Controlled | | |
| CV1 | MXAI_20PV | Overhead Product Purity | %mole |
| CV2 | MXPDI_21PV | Column Pressure Differential | psia |
| CV3 | MXAI_22PV | Bottom Product Purity | %mole |
| CV4 | MXFI_07PV | Top Product Flow | MBLD |
| CV5 | MXFI_06PV | Bottom Product Flow | MBLD |
| CV6 | MXFIC_01OP | Top Reflux Flow Controller Output | % |
| CV7 | MXTIC_03OP | Feed Temperature Controller Output | % |
| CV8 | MXLIC_05OP | Top Level Controller Output | % |
| CV9 | MXLIC_06OP | Bottom Level Controller Output | % |
| CV10 | MXFI_10OP | Fuel Gas Controller Output | % |
| CV11 | MXTIC_03OW | Feed Temperature Controller OutPut Windup | % |

Fig 5 Variables of DeEthanizer Example

Fig 6 Example Models Used in Simulation Case Study

Fig 7: Without Dynamic Variance Correction - Prior Art

Fig 8 Without Dynamic variance Correction - Prior Art

Fig 9 With Dynamic Variance Correction - Present Invention

Fig 10 With Dynamic Variance Correction - Present Invention

USE OF DYNAMIC VARIANCE CORRECTION IN OPTIMIZATION

FEDERALLY SPONSORED RESEARCH

Not Applicable

SEQUENCE LISTING OR PROGRAM

Not Applicable

BACKGROUND

1. Field of Invention

This invention relates to incorporating a correction for dynamic variance of manipulated variables and controlled variables in steady state optimization in order to minimize dynamic violation of the controlled variables.

2. Background of the Invention

Optimization of a process having a plurality of independently controlled, manipulated variables and at least one controlled variable which is dependent on the manipulated variables using deterministic steady state process model and optimization method has widely been practiced in various industry including refining, chemical and pulp manufacturing.

Typically, results of the steady state optimization are applied to the (dynamic) process system having dynamic responses to the changes made. The resulting dynamic responses of the process alter the predicted steady state values of the controlled variables. The updated predicted steady state value of the controlled variables is subsequently used in the optimization method to calculate new change in the manipulated variables. Depending on the scope and time horizon, in practice, a steady state optimization may include feedback of actual performance into updating of the results of the steady state optimization on a continuing basis to a varying degrees; at one extreme, applications such as real-time process control, this feedback is automatic and well defined whereas at the other extreme applications such as plant wide production planning and control the feedback correction is not well defined and even not present. In case of the latter, essentially the steady state optimization is used to generate a future plan of actions but with very limited form of feedback correction mechanism for corrections to the future plan of actions when the actual performance of the process system deviates from the planned targets. In which case, the whole process of production planning and control is essentially an ad-hoc mix of a very detailed and comprehensive plan generation with almost non-existent feedback correction consistent with the initial plan generation. Instead, most often a new plan is generated with a few changes based on exception.

The constraint limits (low/high limits) of the variables used in the steady state optimization are also to be honored by the process system performance during the transient from current state to the final desired optimal steady state. These low/high limits are required to be not violated or in the least the violation be kept to the minimum.

In practice due to reasons of measured and unmeasured disturbances to the process system and due to the inherent dynamic characteristics of the process, the controlled variables would unavoidably violate their constraint limits. These dynamic constraint violations become serious and cause degrading of controllability of the process when one or more manipulated variables saturate by way of hitting one of its limits or of its final control valve output limits. Furthermore, because of marked changed in the response of the process when a manipulated variable saturates, the controllability of the process degrades significantly. Therefore, in practice, it becomes a difficult problem in which on one hand the optimizer is required to push up against the manipulated variables limit for increased optimality whereas on the other hand, at the manipulated variables limit, controllability of the process is adversely affected. Therefore, it is not uncommon to find that at times just when the process seemed to be at or very close to the optimal steady state, the process system seemed to become "out of control". To counter this problem, in practice, most model predictive control implementation provide for what is generally known in the prior art as "linearization of valves output" for saturating manipulated variable. Although this technique offers some relief from the "out of control" problem, it practice, it introduces its own problem in that the "linearization" itself could be erroneous and therefore, induce dynamic oscillation of its own.

When a manipulated variable saturates, it essentially becomes ineffective for affecting the process in the desired manner. For instance, when a fuel gas flow valve saturates, process outlet temperature is not controllable to decreasing inlet temperature by manipulation of the fuel gas flow set point. Therefore, when this happens the process outlet temperature kind of behaves as if it is icicles hanging. That is, what is otherwise should be a two sided process response to its set point, at the manipulated variable saturation, the process response becomes one sided, either looking like icicles or spikes.

One of the objects of the invention presented herein is to maintain a certain degree of controllability of the process at or near manipulated variable valve saturation or its limit that would eliminate and minimize the loss of controllability problem mentioned above.

Therefore, there is a need to improve the process of steady state optimization that would reflect the dynamic variations of the variables. Another object of the invention presented herein is to control dynamic violation of low/high limits of the controlled variables in general.

One area where steady state optimization has widely been applied is in model predictive control, MPC. For the purpose of exposition, this application type will be used hereon for this invention, however, the method is equally applicable to other types of application involving steady state optimization as it relates to a process system having a plurality of manipulated variables and controlled variables with dynamic response characteristics. MPC has been widely applied in the process industry for control and optimization of complex multivariable processes. Intrinsically MPC attempts to optimize future behavior of complex multivariable processes while minimizing dynamic violation of low and high constraints (limits) of the variables.

In practice a number of different approaches have been developed and commercialized in dealing with dynamic constraints violation. U.S. Pat. Nos. 4,349,869 and 4,616,308 describe an implementation of MPC control called Dynamic Matrix Control incorporating a set of different tuning weights for controlled variables within the dynamic controller. These weights are adjusted as dynamic process value approaches the constraints limits. In another U.S. Pat. No. 6,122,555, and its commercial implementation known as RMPCT, it incorporates a funnel around the violating limits that permits the dynamic controller to determine a suitable trajectory returning the dynamic process value back towards the limit.

However, all of these implementations of MPC have one thing in common when it comes to constraint violation of the controlled variables. They all rely on employing in one form or another dynamic tuning weights in the dynamic controller of a model predictive controller to dampen down dynamic violation. They do not include any measure of correction in the steady state optimizer to compensate for likely dynamic violations of the constraints. The steady state optimizer is strictly formulated with reference to predicted steady state and the constraints satisfaction based on the assumption that the dynamic value of the controlled variables will eventually settle down to the predicted steady state values. Inherently in all these implementations there is this built-in unresolved problem of dynamic constraint resolution. The dynamic constraints resolution problem is essentially solved by way of feedback of the process response and the dynamic tuning weights. Therefore, most of these implementations do not offer a robust and sustained quality of control in which dynamic constraints violations are well behaved and remain within reasonable bounds. Instead, when dynamic constraints violations become excessive the control engineer is required to adjust the tuning weights albeit by trail and error method, not an easy task at all even in a moderate size MPC.

The steady state optimizer of most MPC implementations does not incorporate any explicit measure that would prevent dynamic constraint violation. The steady state optimizer is purely based on predicted steady state value of the variables and the steady state model gains.

An improved and more effective method of dealing with dynamic constraint violation is needed for robust and sustained performance of model predictive controllers.

Figure 2:
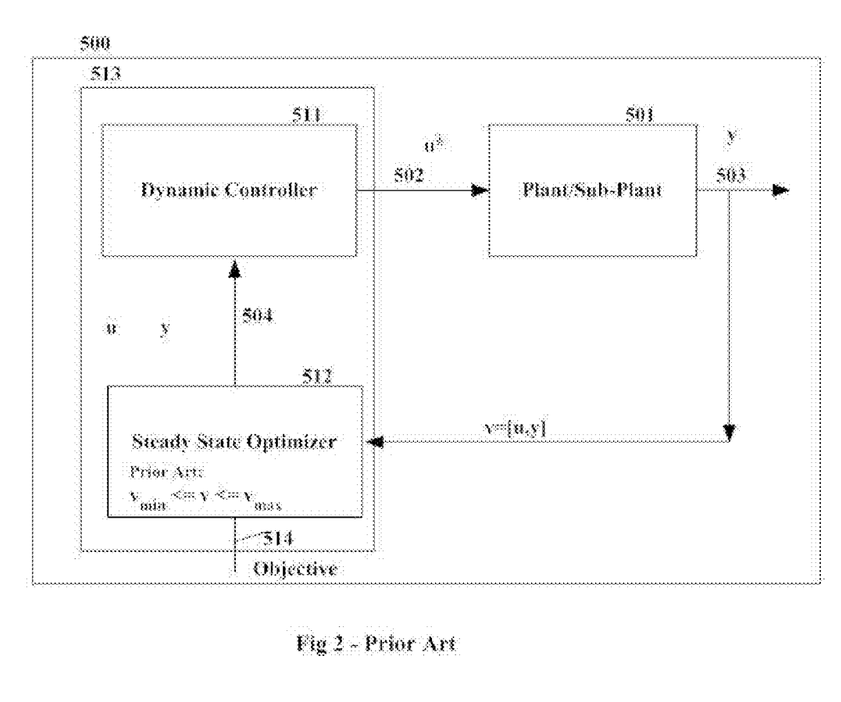
FIG. 2 is a block diagram illustrating the basic functional structure of the steady state optimization as practiced in the art

Referring to FIG. 2, there is shown in block diagram form an implementation of as practiced in the prior art Model Predictive Control, MPC. Hereafter, as practiced in the art Model Predictive Control will be referred to as MPC. As apparent from FIG. 2, MPC block 513 is divided into a steady-state calculation and a dynamic calculation. A "plant" is also represented by block 501. The term "plant" is intended to refer to any of variety of systems, such as chemical processing facilities, oil-refining facilities.

In the interest of clarity, not all features of actual implementation of a MPC controller are described in this specification.

The dynamic MPC calculation has been studied extensively (see e.g., S. J. Qin and T. A. Badgwell, "An Overview of Industrial Model Predictive Control Technology", in Fifth International Conference on Chemical Process Control, J. C. Kantor, C. E. Garcia, and B. Caranhan, Eds., No. 93 in AIChE Symposium Series 316, 1997, pp. 232-256). The goal of the steady state MPC calculation is to recalculate the targets for the dynamic controller 511, every time the MPC controller 513 executes, because disturbances entering the system or new input information from the operator may change the location of the optimal steady state. This separation of the MPC algorithm into a steady-state and dynamic calculation was alluded to, for example, by C. Cutler, A. Morshedi, and J. Haydel, "An Industrial Perspective on Advanced Control", AICheE National Meeting Washington, D.C., 1983 and is now common in industrial MPC technology.

Briefly, the overall system depicted in FIG. 2, comprising as practiced in the art, MPC 513 and plant 501, operates as follows: MPC 513 performs dynamic and steady-state calculations to generate control signals reflecting optimal "inputs", u* to plant 501. Inputs u* to plant 501 on line 502. Thus, line 502 in FIG. 2 is representative of what would be, in "real-world" application of MPC technology, a plurality of electrical control signals applied to controlled components (valves, for example) to control a plurality of controlled variables, y (pressures, flow rates, temperatures, for example) within the plant.

On the other hand, the plant 501's operation is symbolically represented in FIG. 2, by a plurality of "outputs" y which are represented in FIG. 2 as being carried on a line 503, thus line 503 is representative of a plurality of electrical signals reflecting the operational status of plant 501.

As shown in FIG. 2, output(s) y are fed back to be provided as inputs to steady-state target calculation block 512. Steady-state target calculation block 512 operates to generate so-called "target" inputs and outputs, u and y, respectively, as a function of plant output(s), y and as a function of an "objective" which is symbolically represented in FIG. 2 as being carried on a line 514. The target inputs u and outputs y are represented in FIG. 2 as being carried on line 504. Target inputs u are those inputs to plant 502 which, based on the calculations made by calculation block 513, are expected based on the MPC modeling of plant 501, to result in plant 501 operating to produce the target y.

Typically, the steady state optimizer uses a steady-state version of the dynamic process model used for the dynamic controller move calculation. The recalculated optimal steady state is then passed to the dynamic controller. The steady-state target calculation for linear MPC, represented by block 512 in FIG. 2, takes the form of a linear program ("LP").

Although the issue of dynamic violation of the constraints in the dynamic optimization has been known to be a difficult problem, little progress has been made to develop simple and effective methods of preventing much of the dynamic violations.

SUMMARY OF THE INVENTION

Accordingly, the present invention relates to a new formulation of the steady-state optimization that explicitly accounts for dynamic variations of the variables in the steady-state target calculations so as to minimize and prevent dynamic violations of the constraints of the variables.

BRIEF DESCRIPTION OF THE DRAWINGS

The foregoing and other features and aspects of the subject invention will be best understood with reference to a detailed description of a specific embodiment of the invention, which follows, when read in conjunction with the accompanying drawings, in which.

DETAILED DESCRIPTION OF A SPECIFIC EMBODIMENT OF THE INVENTION

Figure 1:
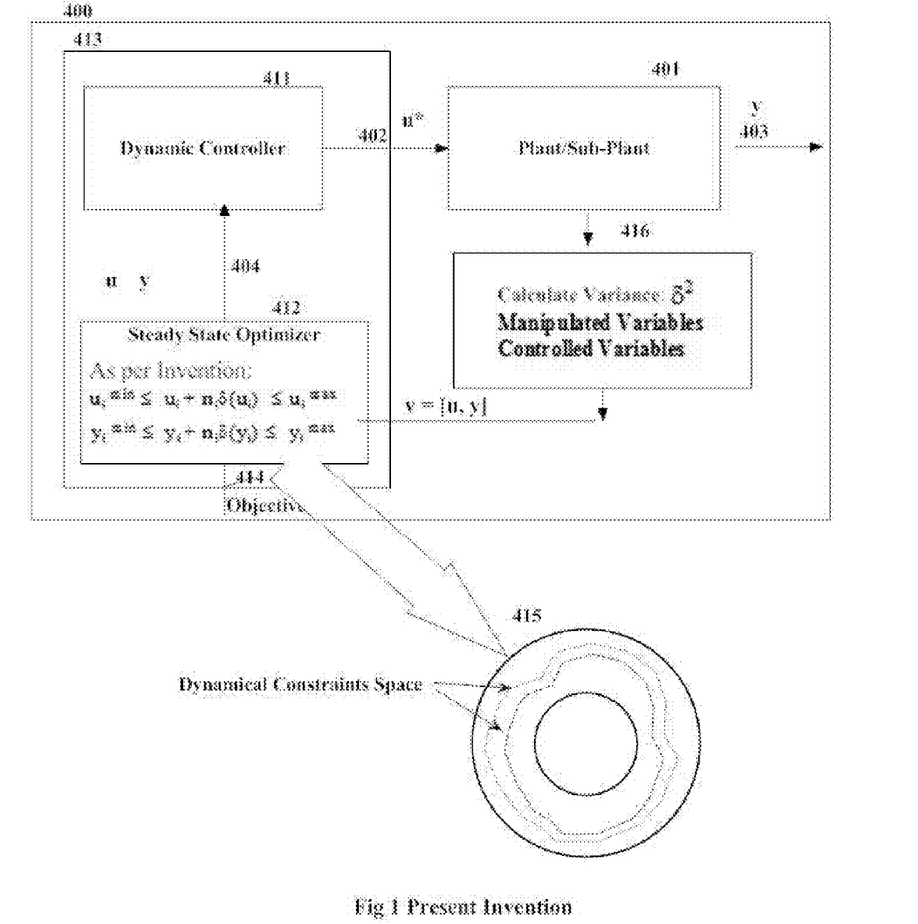
FIG. 1 is a block diagram illustrating the basic functional structure of the subject invention

FIG. 1 outlines the apparatus of and functioning of optimization and control relating to a dynamic process system as per the proposed invention. For the sake of brevity, the differences and the contrasts of FIG. 1 in relation to FIG. 2 will be highlighted.

Basically, the overall functioning of the apparatus and the system as proposed by the invention as per FIG. 1 works as follows;

1) With the proposed invention, block 416 calculates variance of all of the variables as stated below. These variances are calculated at the same frequency as that of the control actions. The process values required for these are read from a real time data gathering system such as distributed control system.
2) The calculated variance along with the weighing factor for each of the variables is used in modifying the high and low constraints as stated below, in block 412 as part of the steady state optimization solution.
3) The modified constraints are then used in the solution of the steady state optimization as per the invention in block 412.
4) The steady state optimal targets as determined from block 412 are then passed on to a dynamic controller, block 411 which then calculates manipulated variables moves.
5) The output from block 412 is the actual manipulated move that gets applied to the process of block 401.
6) The applied manipulated variable move produces dynamical response from the process, block 401 as controlled variable dynamic response.
7) The dynamic controlled variable response along with the dynamic manipulated variable value is used in updating the variance in block 416.
8) This cycle of updating variance of all the variables and their use in the steady state optimization as proposed by the invention followed by the manipulated variable move on the process continues.

The changing value of the constraints limits is depicted in FIG. 1 as changing "dynamic constraint space", block 415.

In practice, there are a number of ways in which the proposed invention can be utilized. In its simplest form, the proposed invention can be implemented as an adjunct to an existing steady state optimization control system with the addition of block 416 and a correction term for each of the inequality constraints as per the invention stated below. The invention anticipates that the dynamic variance correction can be incorporated in a variety of manners as a part of a steady state optimization of linear or non-linear formulation relating to a dynamical system comprising of at least one manipulated variable and at least one controlled variable. The specific embodiment of the invention as disclosed herein relating to model predictive control is meant to be an exemplary application and not limiting to it.

The steady state optimization of a model predictive controller is typically formulated as follows. For the constrained steady state optimization, the optimization problem is stated as follows, $$J(v, p) \quad\quad 1.1$$

Max J
Subject to $$v \geq 0 \quad\quad 1.2.1$$

$$v_{min} \leq v \leq v_{max} \quad\quad 1.2.2$$

Where
$v_{min}$ is low limit of process variables, v
$v_{max}$ is high limit of process variables, v
p is economic price associated with v The variables v are further classified as independent and dependent variables. Independent variables are considered inputs to the process and dependent variables are outputs of the process. Thus, $$[v]=[u, y] \quad\quad 1.3.1$$

In a general case, y is describable by a non-linear function of u as $$y=G(u) \quad\quad 1.4$$

and the objective function J( ) in eqn 1.1 is describable as a non-linear function of input variables u and output variables y.

For the purpose of exposition of the invention, it is assumed that y is a linear function of u and the objective function is also a linear function. However, the invention is applicable to non-linear process system with non-linear objective function as what is proposed in the invention is independent of the process system model and the objective function as will be evident from the details to follow. For the sake exposition, the invention will be described in reference to its application in model predictive control system though not limited to it in anyway.

In Model Predictive Control system with linear models, objective function J is of the form $$J=\Sigma p_i v_i \quad\quad 1.1.1$$

Where v is set of Variables within the scope of the controller
$p_i$ is economic price associated with $v_i$ A linear form of model is used to describe change in y to change in u as $$\Delta y=g(\Delta u) \quad\quad 1.4.1$$

where g() is process based relationship defining steady state changes in y for changes in u. One particular form of g() which is commonly used is that of linear form, that is $$\Delta y=G\Delta u \quad\quad 1.4.2$$

The matrix G is generally termed as process gains matrix. Eqn 1.4.2 is a linear characterization of u and y. In a non-linear application, g() above would be more involved function of the variables.

Using eqn 1.4.2, the dependent variable y new value is calculated as follows in terms of change in the independent variables values:

$$y_j=y_j^*+\Sigma g_{ji}\Delta u \quad\quad 1.4.3$$

$$y_j=y_j^*+\Sigma g_{ji}(u_i-u_i^*) \quad\quad 1.4.3.1$$

Where,
$y_j^*$ refers to predicted steady state value of dependent variable j
$u_i^*$ refers to current value of independent variable i
$g_{ji}$ is steady state gain of dependent variable j, with respect to independent variable i and is included as one of the matrix element of gain matrix G in 1.4.2.

In case of a non-linear form of g($\Delta$u) in eqn 1.4.1, a non-linear method of solution for y would be used. For the purpose of exposition of the invention, linear from of g() as stated by eqn 1.4.3.1 will be used hereon. Those ordinarily skilled in the art would understand as to how a non-linear form of g(Δu) can be adequately treated within the framework of the invention proposed herein.

In order to provide a way of compliance between the steady state optimization solution and the dynamic controller move to follow later, in the prior art most model predictive control would include what is generally referred to as optimization step limitations as follows:

$$|u_i - u_i^*| \leq \min(\text{OptimizationStep}_i, 10 * \text{MaxDynamicControllerMove}_i) \quad 1.4.4$$

where,

OptimizationStep$_i$ is an operator set value for independent variable i,

MaxDynamicControllerMove$_i$ is an operator set value for independent variable i, Inclusion of constraints 1.4.4 is a way to ensure the resulting solution does not force the dynamic controller calculation to become infeasible albeit in an indirect way. However, in practice it is often not easy to set values in constraint set 1.4.4 consistently. Consequently, the constraint set 1.4.4 is not really useful and in reality becomes much harder to change and maintain.

As used herein, the term "dynamic violation of the constraints" as applied to manipulated variables and controlled variables means that the variables do not violate upper and lower constraints at any time.

Even with the inclusion of constraint set 1.4.4, basically the steady state optimization part of a model predictive control in the prior art does not include explicitly any constraints directly or indirectly relating to the dynamic value of the dependent variables (or controlled variables as generally referred to).

An equivalent formulation of the above stated constrained optimization problem using change in value of the variables could be used, what is generally known as "delta" form. However, for the purpose of exposition and without loss of generality, the absolute value formulation will be used hereon.

In the prior art, there are a number of formulations for calculation of dynamic move of the manipulated variables for a model predictive control. They differ in their details in terms of the manner of dealing with dynamic interactions of the controlled variables, dynamic constraint violation and adherence of the dynamic value of the controlled variables to their desired set point as calculated by the steady state optimizer. The details of the dynamic move calculation is presented herein for the sake of providing the context within which the invention presented is most relevant but not limited to it.

For the sake of exposition of the invention presented herein, it suffices to summarize the solution of calculation of dynamic move, ΔU as $$\Delta u = f(e, \hat{G}, u^*, b, c) \quad 2.0$$

Where u is manipulated variable vector u* is manipulated variables target as determined by the optimization e is controlled variable error vector, pv-sp* pv is predicted future value of controlled variables sp* is controlled variable target as determined by the optimization $\hat{G}$ is dynamic response models of the controlled variables with respect to the manipulated variables, as a response matrix consisting of dynamic models b is manipulated variables weight vector c is controlled variables weight vector Δu is change in manipulated variables in future, the first move being the current move f() is based on a least square error minimization one particular form of f() is $$f() = (A^T C A + B)^{-1} e \quad 2.1$$

where,

A is generally known as controller matrix generated from the dynamic models coefficients and augmentation of sum of dynamic moves equal to the steady-state target of the manipulated variables.

$A^T$ is transpose matrix of A

C is what is generally known as controlled variables weight matrix derived from c.

B is what is generally known as manipulated variables weight matrix derived from b.

e is error vector namely as sp-pv, where sp is set point vector for the controlled variables and pv is predicted process value vector for the controlled variables augmented with the vector of manipulated variables target-manipulated variable current value As practiced in the art, the weight vector B and C are set by the practitioner based on practical experience of operation of the process. Nevertheless, these weights are at best based on the understanding of the process, devoid of any structured basis. Typically, they are set initially based on a few simulation studies to ascertain expected outcomes of action in different scenarios of constraint violations and conflicts. However, they are not often updated easily. Therefore, for most part these tuning values remain unchanged except when a significant problem arises in that the controller actions do not jibe with the particular process conditions. In which case, these weights are adjusted only after the fact. They will be changed once again when something else goes wrong. These weights provide only a limited degree of control over the dynamic violation of the controlled variables. It does not possess any self-adaptive property. Consequently, tuning these weights becomes a problem in combinatorial values, which for even a moderately sized problem becomes a daunting task.

The proposed invention includes in the steady state optimization, information relating to dynamic variance of the variables so as to ensure that dynamic violation of the constraints of the variables are significantly reduced and eliminated in the sense of the stochastic measure. It proposes to modify the inequality constraints set 1.2.2 as follows separately for independent variables and dependent variables; for independent variables:

$$u_i^{min} \leq u_i + n_i \delta(u_i) \leq u_i^{max} \quad 1.2.3$$

$$0 \leq n_i \delta(u_i) \leq 0.5(u_i^{max} - u_i^{min}) \quad 1.2.3.1$$

where, $\delta^2(u_i)$ is current value of variance of dynamic value of independent variable i $n_i$ is a what is herein termed as standard deviation weight for independent variable i, and $n_i \geq 0$ $n_i \delta(u_i)$ in eqn 1.2.3 and its use later is termed hereon as variance correction for independent variable i.

$n_i$ can be an operator set value or can be determined as a part of a constrained optimization solution in which it is maximized subject to, $$0 \leq n_i \leq n_i^* \quad 1.2.3.2$$

where $n_i^*$ is an operator set maximum value of $n_i$.

Similarly for controlled variables, y an equivalent constraint formulation would be $$y_j^{min} \leq y_j + n_j \delta(y_j) \leq y_j^{max} \qquad 1.2.4$$

$$0 \leq n_j \delta(y_j) \leq 0.5(y_j^{max} - y_j^{min}) \qquad 1.2.4.1$$

where, $\delta^2(y_j)$ is current value of variance of dynamic value of dependent variable j, $n_j$ is a what is herein termed as standard deviation weight for dependent variable j, and $n_j \geq 0$ $n_j \delta(y_j)$ in eqn 1.2.4 and its use later is termed hereon as variance correction for dependent variable j.

$n_j$ can be an operator set value or can be determined as a part of a constrained optimization solution in which it is maximized subject to, $$0 \leq n_j \leq n_j^* \qquad 1.2.4.2$$

where $n_j^*$ is an operator set maximum value of $n_j$.

Note: δ in eqn 1.2.3 and 1.2.4 is what is generally known as standard deviation and termed as "sigma" commonly in the art. We will refer to δ by its generic name as sigma. Therefore, $n_i$ in eqn 1.2.3.1 and hereon will be referred to as standard deviation weight or alternatively as sigma weight. The proposed invention does not restrict sigma weight to be an integer value, though use of integer value would provide a more meaningful significance. Therefore, a value of 3 or 6 would impart the meaning of 3-sigma or 6-sigma variance control respectively. Furthermore, the variance is calculated over a time horizon consistent with the time to steady state of the process and/or individual process variable. For instance, a controlled variable, the time horizon can be the maximum time to steady state for changes in one or more manipulated variables. Those ordinarily skilled in the art would appreciate that this time horizon for variance can be chosen judiciously depending on the underlying dynamic response of the variables, its frequency and the magnitude of measured as well as unmeasured disturbances. For instance, for a process with time to steady state of 120 minutes, the time horizon for variance can be some multiple of 120 minutes for all variables. Too small a time horizon would cause the controller to be unnecessarily too responsive and too high a time horizon would cause the controller not to be sufficiently responsive to dynamic violations.

An alternate more general formulation of eqn 1.2.3 and 1.2.4 can be written for u and y as follows $$u_i^{min} + n_i^{max}\delta(u_i) \leq u_i \leq u_i^{max} - n_i^{max}\delta(u_i) \qquad 1.2.5$$

$$u_i^{min} + n_i^{min}\delta(u_i) \leq u_i^{max} \qquad 1.2.5.1$$

$$u_i^{min} \leq u_i^{max} - n_i^{max}\delta(u_i)_i \qquad 1.2.5.2$$

$$u_i^{min} + n_i^{min}\delta(u_i) \leq u_i^{max} - n_i^{max}\delta(u_i) \qquad 1.2.5.3$$

$$n_i^{min} \geq 0 \qquad 1.2.5.4$$

$$n_i^{max} \geq 0 \qquad 1.2.5.5$$

$$\delta(u_i) \geq 0 \qquad 1.2.5.6$$

where, $n_i^{min}$ is considered to be standard deviation weight for minimum constraint $n_i^{max}$ is considered to be standard deviation weight for maximum constraint i is index for vector [u] with i=1, number of manipulated variables $n_i^{min}$ and $n_i^{max}$ permit a asymmetrical correction of the constraints which could be useful in many instances. For example, in controlling a reactor bed temperature with a quench flow, for all practical purposes $n_i^{max}=0$. However, for the reason of generality, eqn 1.2.5-1.2.5.6 provide a comprehensive and flexible method of specifying the variance correction under varying situations. Constraint 1.2.5.3 is important in that to prevent the corrected high/low limits do not cross. $n_i^{min}$ and $n_i^{max}$ can be an operator set values or can be determined as part of a constrained optimization solution in which their values are not to exceed the operator set values.

In similar manner, eqn 1.2.4 is generalized in the same manner as eqns 1.2.5-1.2.5.6 as eqn 1.2.6-1.2.6.6.

$$y_j^{min} + n_j^{min}\delta(y_j) \leq y_j \leq y_j^{max} - n_j^{max}\delta(y_j) \qquad 1.2.6$$

$$y_j^{min} + n_j^{min}\delta(y_j) \leq y_j \qquad 1.2.6.1$$

$$y_j^{min} \leq y_j^{max} - n_j^{max}\delta(y_j) \qquad 1.2.6.2$$

$$y_j^{min} + n_j^{min}\delta(y_j) \leq y_j^{max} - n_j^{max}\delta(y_j) \qquad 1.2.6.3$$

$$n_j^{min} \geq 0 \qquad 1.2.6.4$$

$$n_j^{max} \geq 0 \qquad 1.2.6.5$$

$$\delta(y_j) \geq 0 \qquad 1.2.6.6$$

where, $n_j^{min}$ is considered to be standard deviation weight for minimum constraint $n_j^{max}$ is considered to be standard deviation weight for maximum constraint j is index for vector [y] with j=1, number of controlled variables $n_j^{min}$ and $n_j^{max}$ permit a asymmetrical correction of the constraints which could be useful in many instances. For example, in protecting a reactor bed temperature, for all practical purposes $n_j^{min}=0$. However, for the reason of generality, eqn 1.2.6-1.2.6.6 provide a comprehensive and flexible method of specifying the variance correction under varying situations. Constraint 1.2.6.3 is important in that to prevent the corrected high/low limits do not cross. $n_j^{min}$ and $n_j^{max}$ can be an operator set values or can be determined as part of a constrained optimization solution in which their values are not to exceed the operator set values.

For the sake of simplicity, hereon eqn 1.2.3 and 1.2.4 will be used. However, the eqn 1.2.5 and 1.2.6 could be used just as well with the exception of additional standard deviation weights for each of the variables.

At first glance it would seem that use of variance correction for independent variables would not be appropriate, as it would unnecessarily restrict the scope of optimization leading to at times infeasible solution. However, when this problem is analyzed in an overall sense and wider context, it will be apparent that in fact, counter-intuitively the use of variance correction for independent variables has its own stabilizing effect. First of all, the reduced range of the independent variables (normally considered to be the manipulated variables) would permit the size of optimization step to be reduced. This in turn would reduce size of dynamic move by the controller. The reduced dynamic move by the controller would in turn keep dynamic oscillations in the dependent variables to minimum, thereby having a stabilizing effect on the overall optimization and control of the process. As for the reduced range in the independent variables causing infeasible solution, this would not pertain to real processes. Because, real processes have what is generally known as throughput variables such as rate of feed and/or rate of energy input such as rate of fuel gas etc that can always be reduced to achieve a feasible solution. Of course, in the penultimate case, this could lead to the process operating at its minimum throughput level or possibly shutting it down completely.

Furthermore, the standard deviation weight involved with variance correction can be set at different values by the operator permitting an appropriate extent of variance correction consistent with the nature of the variable and its effect on the process response. Hence, both the independent variables and dependent variables can selectively be set up to have variance correction at different extent.

For the purpose of description of the present invention, use of variance for correction of the inequality constraints as stated above and the manner of its use is termed as variance control in steady state optimization.

In the above mentioned equations relating to variance correction, for manipulated variables, the variance term $\delta(u_j)$ is calculated from the actual process value of the variables based on a time horizon and frequency appropriate to the control system design and its operation. It is conceivable that the variance correction term can be construed in many different ways depending on the dynamic behavior characteristics of the variables and its impact on the controller performance. For the sake of exposition, a simple form of the variance correction term is used in describing the present invention though not limited to it.

For controlled variables, basically the variance term, $\delta(y_j)$ can be calculated in more than one way. One simple way is to use actual process value (dynamically varying). That is to say $\delta(y_j)$ is $\delta(y_j(pv))$, where $y_j(pv)$ refers to process value of variable $y_j$. Another way is to use the difference of process value of the controlled variable and its set point/target as calculated by the steady state optimization. That is to say $\delta(y_j)$ is $\delta(y_j(pe))$, where $y_j(pe)$ is difference of process value and set point of variable $y_j$. Again, the variance term can be calculated variously depending on the control time horizon and controller frequency. Those skilled in the art can judiciously chose the appropriate method of calculation. For the sake of exposition, hereon, the variance term for the controlled variable is based on process value of the controlled variable.

Those skilled in the art would appreciate the general applicability of the inequality of constraints formulation stated above.

Thus, eqn 1.2.5-1.2.5.6 and eqns 1.2.6-1.2.6.6 define the general form of what is termed herein as "dynamic variance correction" in model predictive control. These eqns define a dynamically changing constraint space for the variables involved.

Figure 3:
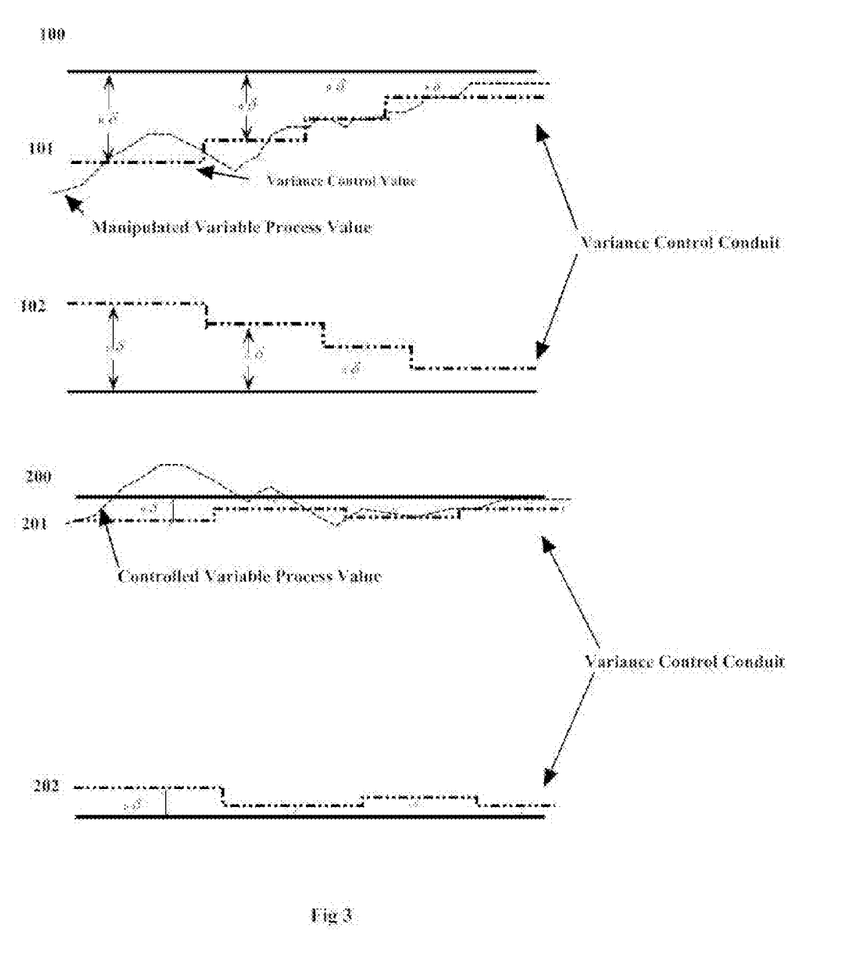
FIG. 3 is a schematic diagram of application of the proposed invention when applied to low/high constraints of a variable

A graphical depiction of eqn 1.2.3 and 1.2.4 is shown in FIG. 3. As depicted, use of standard deviation weight and variance essentially creates a time varying conduit, shown as (101,102) and (201,202) dynamically contracting/expanding the low and high constraints to be used in the steady state optimization in response to dynamic variations in both independent and dependent variables respectively. As the variables attain the expected steady state along with the disturbances dying down the variance for each of the variables would approach zero. Thus, in approaching true steady state the constraint range would expand to its fullest value.

In essence, the variance correction conduits (101,102), (201,202) set up an internal dynamic low/high limits in accordance with the short-term variations of the variables as determined by actual measurements. Thus, greater the amount of the variance, greater would be the contraction of the normal limits. In practice what this means is that the steady state optimization becomes automatically and adaptively less aggressive as the dynamic controller is attempting to attain the desired steady state. This in turn would have an overall stabilizing effect on the process as a whole. The expanding and contracting dynamic constraint range allows the dynamic controller to respond to changes in the steady state targets in the presence of disturbances and the process dynamics. Intrinsically, the proposed dynamic variance correction is a way of stabilizing the process under control without unduly pushing it to the constraints by way of optimization. It provides for the optimization to back off from pushing the process too hard whilst the process is moving towards the targets and/or responding to the measured/unmeasured disturbances including any model-mismatch error effects.

Basically, the variance correction leads to what is depicted in FIG. 1 as dynamic constraint space in response to varying dynamic variations of all of the variables involved.

The use of variance correction effectively provides for an adaptive method of internal steady state optimization constraints correction for actual measured variance of the process. By setting the standard deviation weight appropriately at the value of 3 and greater provides for what is generally known in the art as 3 sigma and higher stochastic control limits. Higher value of standard deviation weight for a manipulated variable naturally improves controllability of the process at or near its saturation. Obviously, greater controllability of the process affords greater degree of operability of the process, which in turn can protect the process against sudden large disturbances.

For example, for an exothermic reaction process, at or very near saturation of the quench valves, the process is at safety risk for normal process disturbances. As in the prior art, there is no effective means for providing a margin of safety for the process to operate for normal process disturbances. Whereas, the proposed use of variance as per the invention in the steady state optimization provides an immediate and direct feedback correction to the overall optimization and control following a change in the actual short term dynamic variations in any of the variables thus providing a timely margin of safety to the operability of the process.

Tighter control of product qualities is an important criterion for consistent improved process performance. Use of sigma weight of 3 and higher in respect of the controlled variables effectively provide for 3 sigma and higher degree of quality control. In fact, in reference to critical process variables for safe operation of the process, this would provide an adaptive safety of margin of operation in response to changing dynamic process variations.

Another more general embodiment of the invention of described above relates to use of steady state optimization for operations of dynamic process system in which various resources are spent and controlled. The use of dynamic variance correction within a steady state optimization method can be applied in a variety of physical systems. The optimization may be either linear or non-linear and either linear or non-linear models can describe the process system. Those ordinary skilled in the field would appreciate how the present invention can be incorporated within such other optimization situations.

Figure 4:
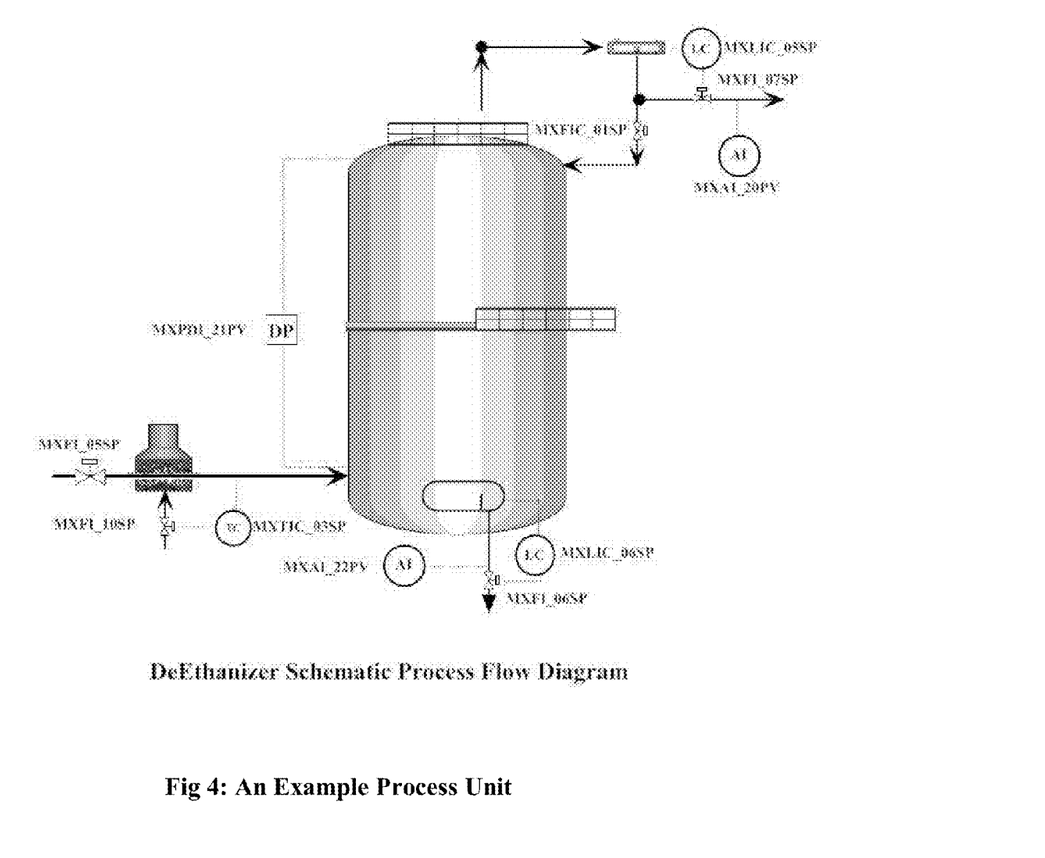
FIG. 4 is an example of process unit used for case studies to follow in which application of the proposed invention is compared with as practiced in the art.
Figure 5:
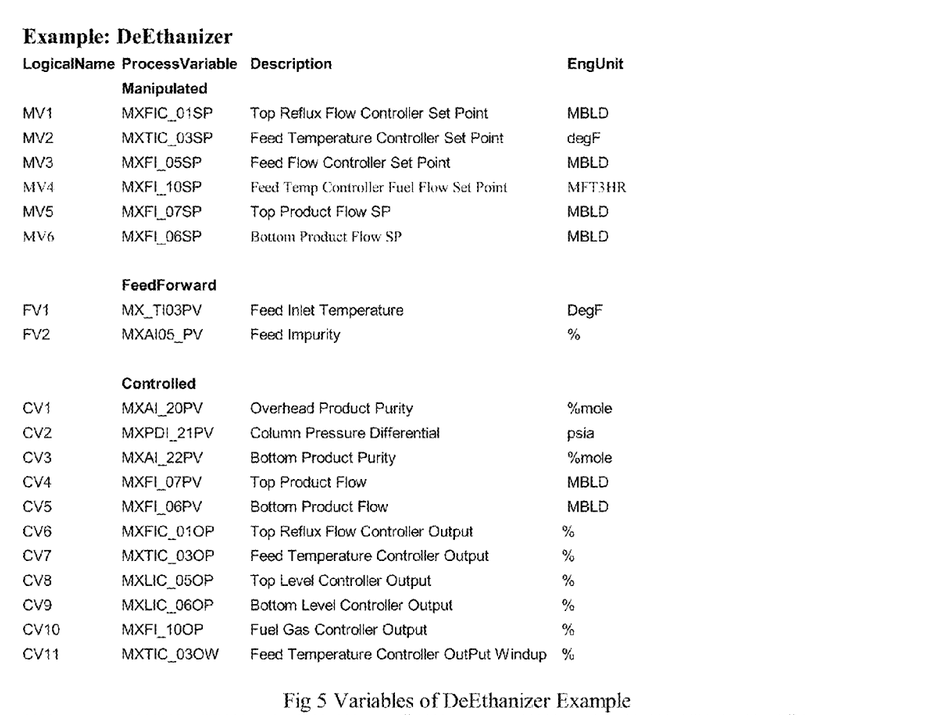
FIG. 5 details the description of the variables of the example process unit
Figure 6:
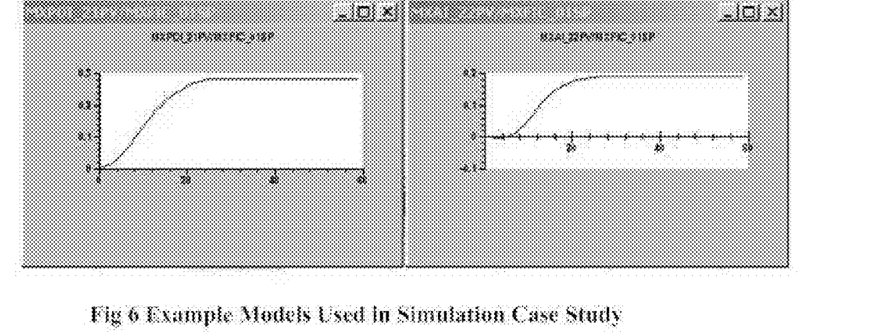
FIG. 6 illustrates exemplary step response process models used for the case studies

An application of the proposed invention is demonstrated by its application to a DeEthanizer process unit as depicted in FIG. 4. FIG. 5 details description of the variables. FIG. 6 shows example of two of the step response process models out of many others used in the case study to follow.

Figure 7:
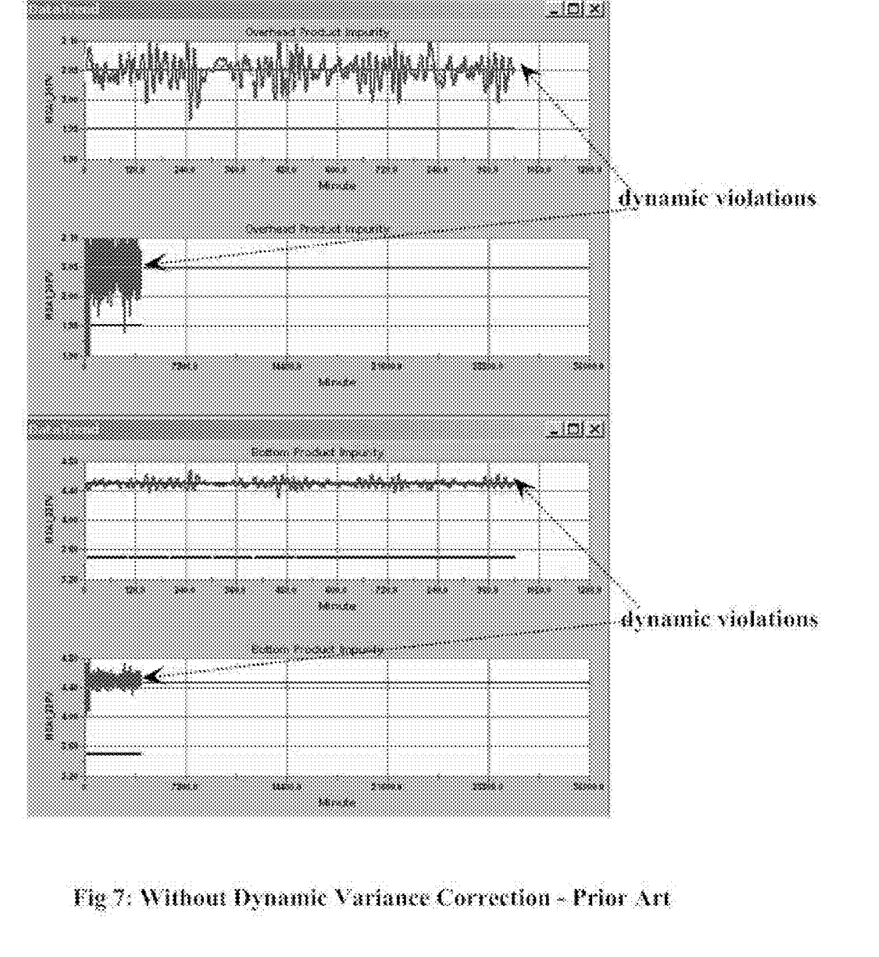
FIG. 7 illustrates performance with no dynamic variance correction
Figure 8:
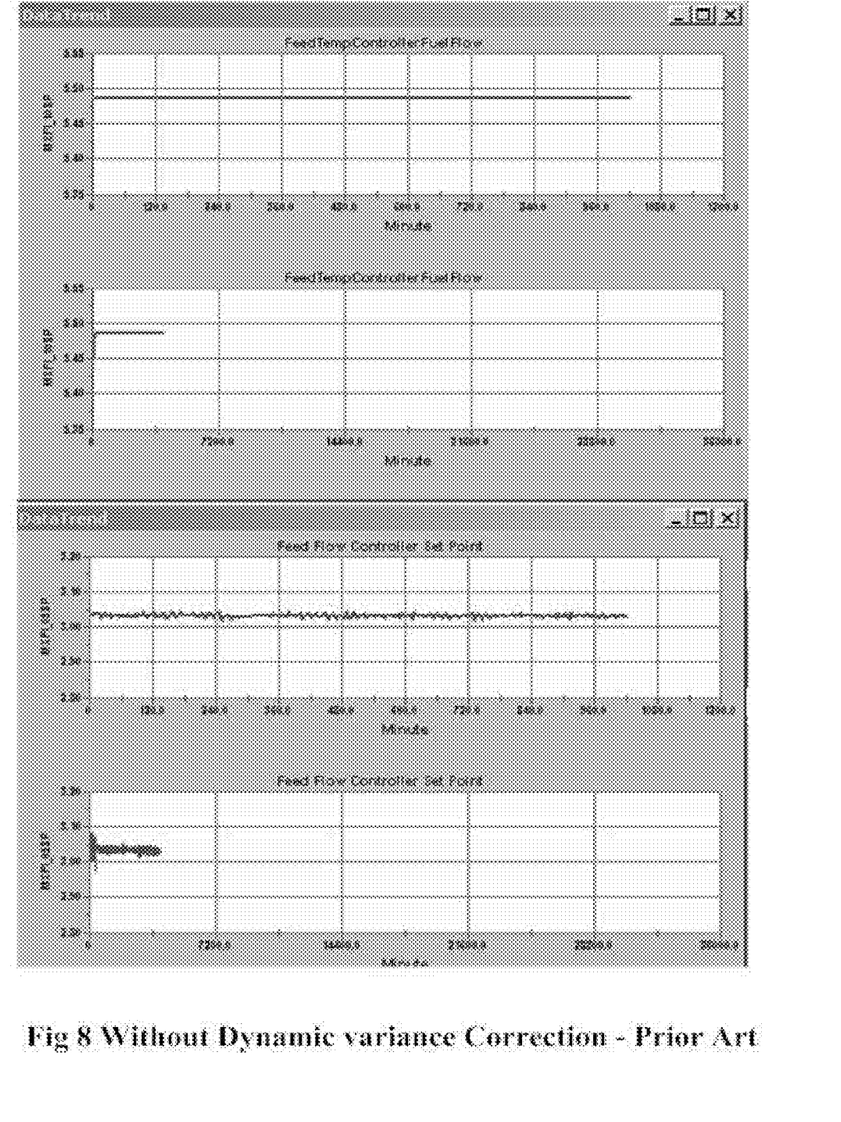
FIG. 8 illustrates performance with no dynamic variance correction

In FIG. 7 and FIG. 8, the results of performance of two cases are compared; case one (FIG. 7) relating to without incorporation of the present invention (that is, as per prior art) and case two (FIG. 8) relating to incorporation of the present invention. In both the case studies, same input conditions and constraints settings and controller tunings are used.

Case One: As per the prior art, it does not include any variance control.

Case Two: As per the invention, it includes variance control with standard deviation weight of 3 for all inequality constraints of the manipulated variables and the controlled variables.

Figure 9:
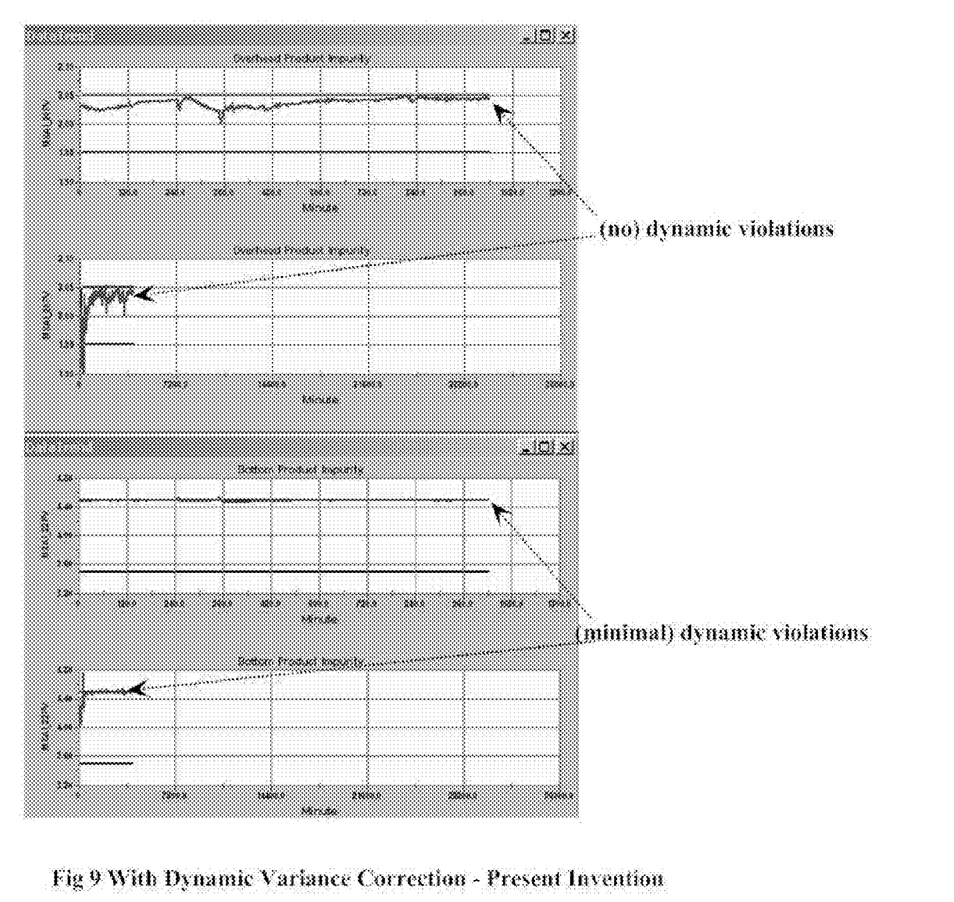
FIG. 9 illustrates performance with dynamic variance correction
Figure 10:
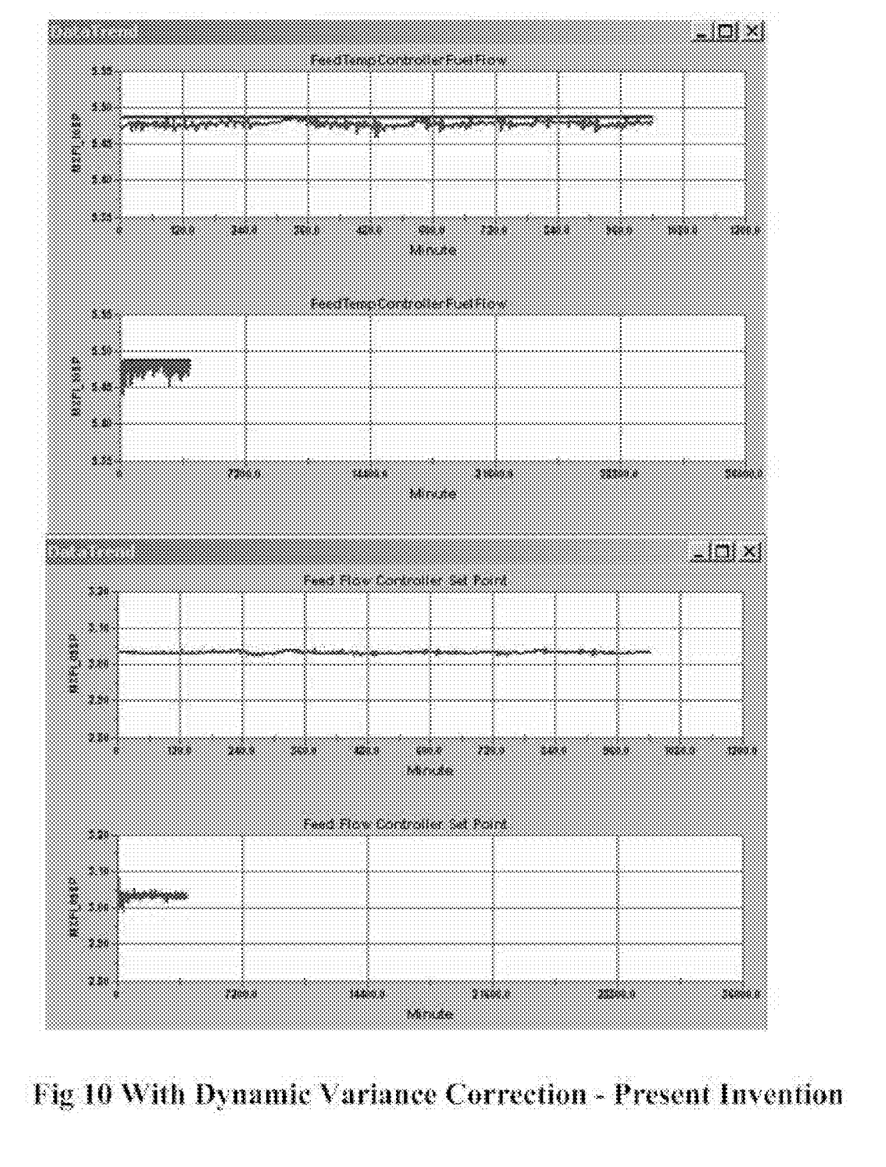
FIG. 10 illustrates performance with dynamic variance correction

For the purpose of exposition, performance comparison of two quality variables namely, overhead product impurity and bottom product impurity are highlighted in FIG. 7-8 along with FIG. 9-10 depicting variations in response Feed Inlet Temperature as disturbance.

In case one, both product qualities are violated constantly at their optimum targets.

In case two, both product qualities are only occasionally violated at their optimum targets. Thus, for most of the time, both product qualities remain within their specification. Occasional violations of product qualities can be further removed by increasing the standard deviation weight if desired.

This comparison study clearly demonstrates the benefit of application of the present invention with much improved performance. As evident from comparison of the performance of the exemplary process system without and with the dynamic violation correction reveal the superior performance when the dynamic violation correction as proposed by the present invention is used with the steady state optimization. Without the dynamic violation correction, both products violate their high limits continuously, whereas, with dynamic violation correction both products have very minimal dynamic violations.

Thus, with the dynamic variance correction as proposed by the invention presented herein, on-spec optimal production is achieved within the stochastic measure as per the sigma value used, whereas without the dynamic variance correction, off-spec optimal production is achieved with no stochastic measure of product spec violations.

More interestingly, without the dynamic variance correction, the fuel gas manipulated variables saturated to its high limit for the entire time period indicating that it was not available for control at all. Whereas, with the dynamic variance correction, the fuel gas exhibit a variation indicating that it was participating in control.

Furthermore, the feed rate variations without the dynamic variance correction is higher than with the dynamic variance correction, indicating that with the dynamic variance correction, not only the product specification are better controlled but also the throughput is more stable.

APPLICABILITY OF THE INVENTION

The proposed invention is applicable in general to any steady state optimization pertaining to a dynamic system where as a result of the optimization; changes are applied to the dynamic system resulting in dynamic responses from the system. Given that in real world most systems are of dynamic in nature, the method of dynamic variance correction can be incorporated as part of any method of optimization that pertains to its steady state condition. As stated the proposed invention applies to the steady state optimization specifically independent of how the changes to the process are calculated and applied or to that matter independent of the nature of the variables and the time frequency of the system response and the control cycle. The dynamic system can be of any form and the variables involved can be of any form and shape. There are no restrictions as to the type of variables and the system structure except that the variables are measurable directly or indirectly.

What I claim:

1. A steady state optimization method of a dynamic process system having a plurality of independently manipulated variables and at least one controlled variable, comprising the steps of:
    a) describing one of a model of steady state effect of said manipulated variables on said controlled variables;
    b) optimizing an objective function comprising of said manipulated variables and their economic price values and further comprising said controlled variables and their economic price values; and
    c) describing inequality constraints for said manipulated variables and said controlled variables such that for each of them, sum of value at steady state and a dynamic variance correction term is greater than or equal to a low limit and is less than or equal to a high limit.

2. A method in accordance with claim 1, wherein said step c) of describing said dynamic variance correction term for each of said manipulated variables further includes a weighing factor multiplying to standard deviation of dynamic variation of each of said manipulated variable and a process value of each said manipulated variable in accordance with chosen time horizon and frequency of control, wherein calculation of dynamic variance for said manipulated variable is based on said process value.

3. A method in accordance with claim 1, wherein said step c) of describing said dynamic variance correction term for each of said controlled variables further includes a weighing factor multiplying to standard deviation of dynamic variation of each of said controlled variable, wherein calculation of dynamic variance for said controlled variable is based on its process value or alternatively based on the difference of a process value of said controlled variable and a set point or a target of said controlled variable as determined by the steady state optimization in accordance with chosen time horizon and frequency of control.

4. A method in accordance with claim 1, wherein said step c) of describing inequality constraints further including said dynamic variance correction term for each of said manipulated variables and said controlled variables, wherein said dynamic variance correction term has a value that is greater than or equal to zero and less than or equal to half of the difference of high and low limit of each of said variables; and wherein said weighing factor is greater than zero or equal to zero; and wherein said weighing factor is set by an operator or determined numerically by way of a constrained optimization; wherein said constrained optimization is subject to its value being less than or equal to a value set by an operator.

5. A steady state optimization method of a dynamic process system having a plurality of independently manipulated variables and at least one controlled variable, comprising the steps of:
    a) describing one of a model of steady state effect of said manipulated variables on said controlled variables;
    b) optimizing an objective function comprising of said manipulated variables and their economic price values and further comprising said controlled variables and their economic price values;
    c) describing inequality constraints for each of said manipulated variables and said controlled variables for low and high limits including a dynamic variance correction term for low constraint and a dynamic variance correction term for high constraint for each of said manipulated variables or said controlled variables, wherein said dynamic variance correction term for low constraint includes a weighing factor multiplying to standard deviation of dynamic variation of said manipulated variable or said controlled variable; and wherein said dynamic variance correction term for high constraint includes a weighing factor multiplying to standard deviation of dynamic variation of said manipulated variable or said controlled variable.

6. A method in accordance with claim 5, wherein said step c) of describing said dynamic variance correction term for said manipulated variables further including calculation of variance for said manipulated variables is based on a process value in accordance with chosen time horizon and frequency of control.

7. A method in accordance with claim 5, wherein said step c) of describing dynamic variance correction term for each of said controlled variables including calculation of dynamic variance of said controlled variables is based on a process value of said controlled variables or alternatively based on the difference of said process value and a set point or a target of said controlled variables; and wherein said set point or said target is determined by the steady state optimization in accordance with chosen time horizon and frequency of control.

8. A method in accordance with claim 5, wherein said step c) of describing inequality constraints further including said correction term for low constraint for each of said variables when added to said low constraint remains less than or equal to said high constraint, at the same time said correction term for high constraint for each of said variables when subtracted from said high constraint is greater than and equal to said low constraint.

9. A method in accordance with claim 5, wherein said step c) of describing inequality constraints further including said weighing factor is a number greater than zero or equal to zero, which is set by an operator or alternatively determined numerically by way of a constrained optimization subject to its value being less than or equal to a value set by an operator.

10. A method in accordance with claim 5 further including asymmetrical constraints; wherein said asymmetrical constraints provide the means of ensuring that the dynamic variance corrected said low and high limits do not cross over each other.

* * * * *